(No Model.)

A. SMITH.
HAY LOADER.

No. 347,389. Patented Aug. 17, 1886.

Witnesses
A. Ruppert
Alfred T. Gage

Inventor:
A. Smith,
Per
Thomas P. Simpson
Attorney

UNITED STATES PATENT OFFICE.

ALBERT SMITH, OF CONWAY, IOWA.

HAY-LOADER.

SPECIFICATION forming part of Letters Patent No. 347,389, dated August 17, 1886.

Application filed May 26, 1885. Serial No. 166,774. (No model.)

*To all whom it may concern:*

Be it known that I, ALBERT SMITH, of Conway, in the county of Taylor and State of Iowa, have invented an Improved Hay-Loader, of which the following is a specification.

The special object of the invention is to improve hay-loaders, as hereinafter described in connection with the drawings, and then clearly pointed out in the claims.

Figure 1:
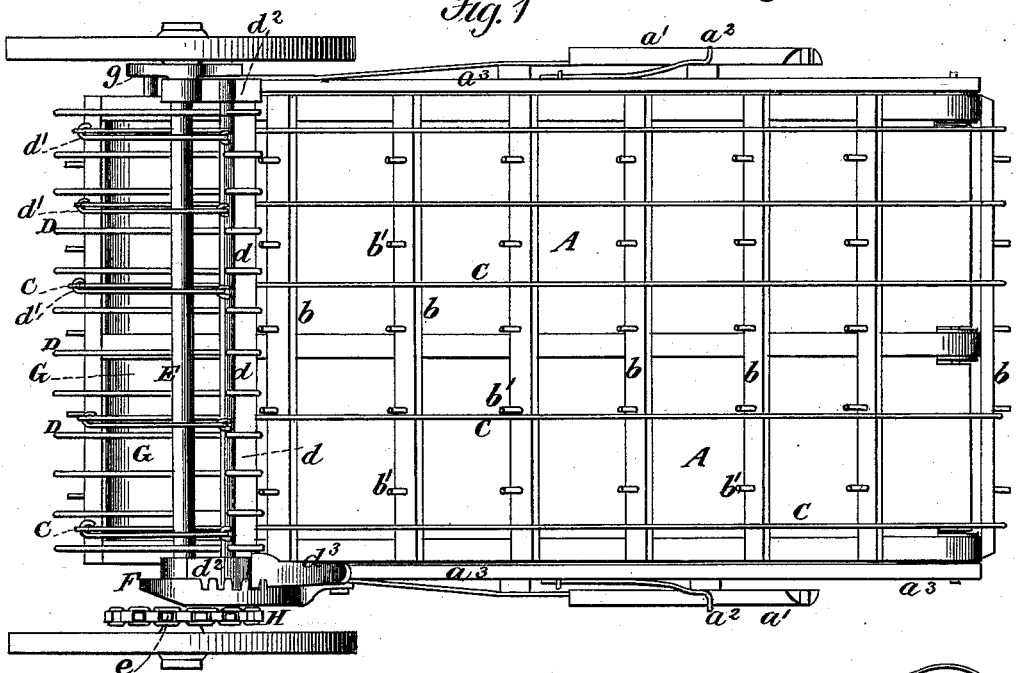
Figure 2:
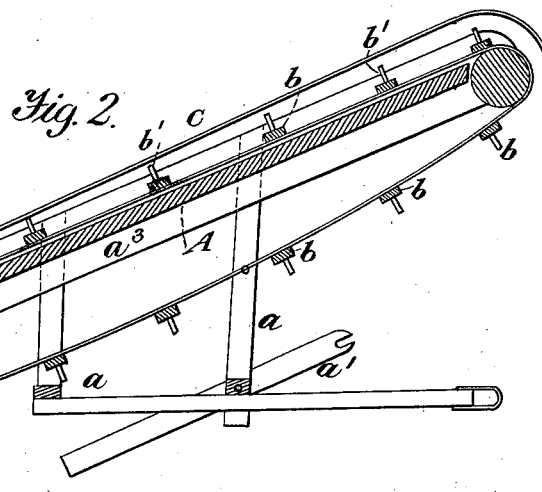
Figure 3:
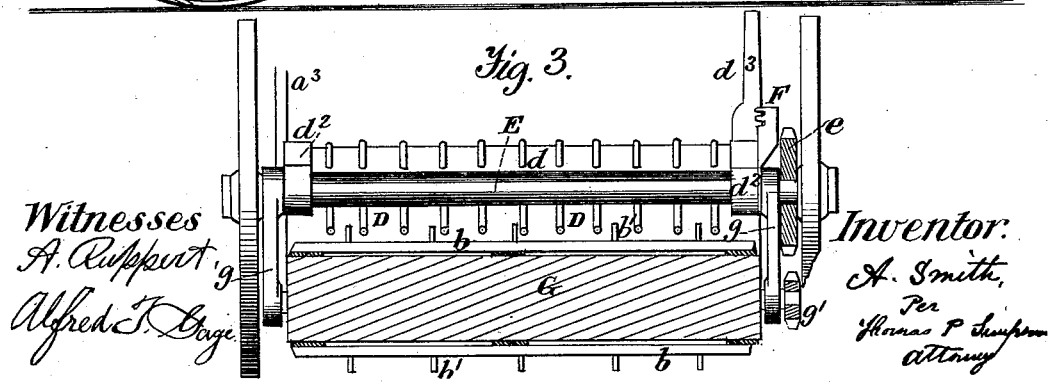

Figure 1 of the drawings is a plan view. Fig. 2 is a longitudinal vertical section looking toward the right side of the machine, so as to show the collocation of the operative mechanism. Fig. 3 is a transverse section.

In the drawings, A represents the platform around which the hay-carrier works. This has a subjacent frame, $a$, to which is attached, at an acute angle to the platform, a median tongue, to which the draft is applied. On each side is a folding leg, $a'$, which turns near or about the middle on a pivot, plays out and in on said pivot, and is open-slotted at the top, so as to engage a stud, $a^2$, whenever the loader is at rest. The platform A has sides $a^3$ $a^3$, between which passes an endless carrier consisting of flexibly-connected cross-bars $b$, having the pins $b'$.

C C represent loose rods or bars, which rest upon the hay as it is carried up to be loaded on a wagon and keep it in place, preventing it from being blown off or otherwise becoming disarranged. They are bent into curves at the upper ends, so as to project over and in front of the top of the platform. They extend to the downward curve of the rake-teeth D, and are connected with the rake-head $d$ by eye-rods $d'$. Thus it will be seen that they will automatically rise and fall, according to the thickness of the hay. The rake-head $d$ is arranged in bearings $d^2$, which may be turned on the axle E, carrying the ground-wheels E'.

F is a curved rack in which may be held the arm $d^3$ from one of the bearings $d^2$, so as to hold the rake up or down or at any suitable height above the ground.

G is a solid cylinder journaled in the bearings $g$ $g$ and carrying a sprocket-wheel, $g'$, which gears with a larger sprocket-wheel, $e$, on the axle by means of a link-chain, H.

The advantages of my hay-loader are as follows: The teeth are so arranged as to go under the main shaft, so as never to interfere with the elevation of the hay, while the rake-head and teeth are so fastened that the rake may be adjusted more or less close to the cylinder G by the arm $d^3$, according to the quantity of hay which is to be delivered, or the rake may be thrown entirely out of operation; also, my solid cylinder running in front of the rake presses all the hay evenly against the carrier-teeth, and facilitates the transfer of the hay from the rake to the carrier; also, my loose rods C not only hold the hay in place on the carrier, but by the upper end curve start it downward, so that the workman can secure it before it can be caught by the wind, and by the rod attachment at the lower end the hay is pressed against the upper side of the roller and to the carrier; also, there is a decided advantage in arranging the cylinder immediately under the axle, whereby the rake and roller may readily adapt themselves to the surface of the ground. The cylinder G is so geared with the sprocket-wheels and chain that it runs at the same speed as if on the ground, thus driving the carrier so that it will empty the teeth of hay as fast as it is gathered. It is also a matter of much convenience to have the legs $a'$ $a'$ loosely hung on hinges when in motion and sprung on stud-fastenings, so as to be stiff when not in use.

Having thus described my invention, what I claim as new, and desire to protect by Letters Patent, is—

1. The combination, with the carrier-frame, of the supporting-frame $a$, provided with end slotted folding legs $a'$, side studs, $a^2$, and end bent spring-latches, the latter arranged to fit over said studs and into the end slots of legs, as shown, as and for the purpose described.

2. In a hay-loader, the combination, with the endless carrier, of the loose rods C, curving over the top of said carrier, extending thence to the downward curve of the rake, and there connected by pivoted rods with the rake-head, as shown and described.

3. A hay-loader having an endless carrier, loose rods C, lying over the carrier, and a rake-head, $d$, combined with eye-rods $d'$, pivoted to rods and head, as shown and described.

ALBERT SMITH.

Witnesses:
N. P. NELSON,
SILAS R. PORTER.